Aug. 11, 1936.  R. TAMM  2,050,866
APPARATUS FOR TESTING THE RUNNING OF TIMEPIECES
Filed Feb. 19, 1934
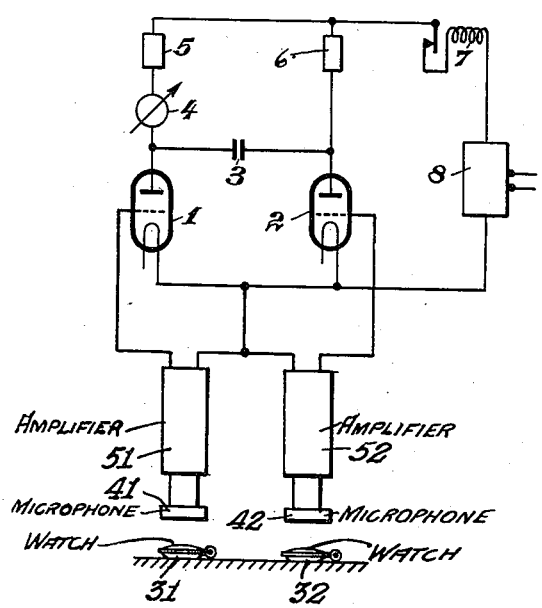
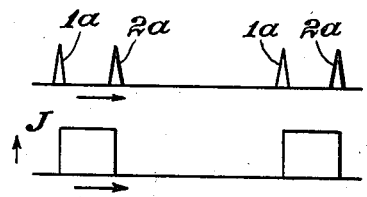
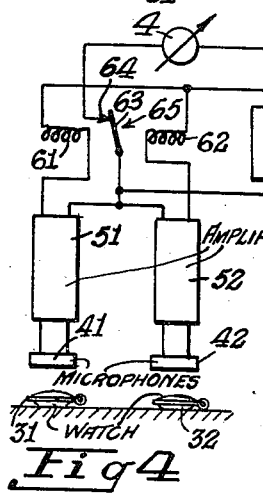
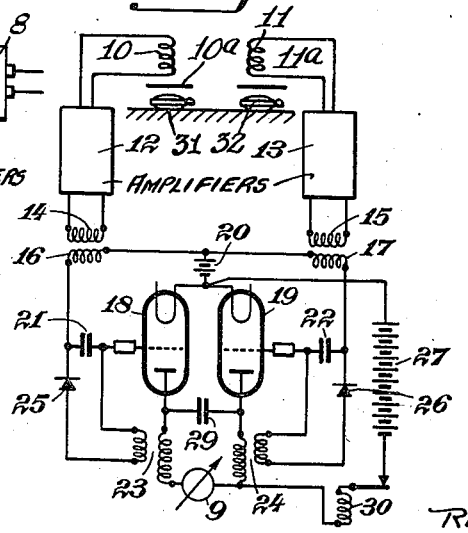
INVENTOR
RUDOLF TAMM
BY
ATTORNEYS.

Patented Aug. 11, 1936

2,050,866

UNITED STATES PATENT OFFICE 2,050,866

APPARATUS FOR TESTING THE RUNNING OF TIMEPIECES

Rudolf Tamm, Berlin-Siemensstadt, Germany, assignor to Siemens & Halske, Aktiengesellschaft, Siemensstadt, near Berlin, Germany, a corporation of Germany Application February 19, 1934, Serial No. 712,002 In Germany February 25, 1933

16 Claims. (Cl. 181—0.5)

The simplest method of testing watches, clocks or other timepieces consists in comparing the distance travelled by the hand of the clock, at the end of a sufficient length of time, with the indication of a standard clock. As soon as special accuracy is required from a clock, however, such a method of testing is extremely inconvenient, because perceptible differences between the clock under test and the standard clock arise only after a number of hours. Since, in order to obtain a high degree of accuracy, a number of corrections are necessary in most cases, approximately a week must be taken for the regulation of a timepiece to secure accurate running.

In order to avoid this delay, it has already been proposed to test the running of clocks by comparing the frequency determined by the oscillations of the balance of the clock under test with a standard frequency, which is preferably produced, for instance, by an accurately running clock with the same transmission or gear ratio between escapement wheel and hand as the clock under test. In order to be able to determine differences in the shortest possible time, it has furthermore been proposed to effect this frequency comparison by exciting the stator of a small single-phase synchronous motor with one frequency and the rotor of the motor with the other frequency, so that the rotor shifts in accordance with the phase displacement between the two frequencies. This shift may be read off at an indicator.

According to the present invention, the accuracy of the testing method last-mentioned can be further improved and the energy expenditure necessary for the indication can be reduced if the phase displacement between the frequencies under comparison is rendered visible at a current indicating or current-responsive instrument, which is supplied from a current source with current impulses, the duration of which corresponds to the phase difference existing at the time between the two frequencies. To this end, use is made preferably of two relays, one of which is energized, for instance, in step with the frequency of the clock under test, while the other is energized in step with the standard frequency. The two relays are so coupled together that they act on one another in such a manner that, on the switching-in of one, the other is de-energized. If the instrument is connected in a circuit controlled by one relay, then the duration of the current impulses flowing through this instrument is dependent upon the phase displacement between the two frequencies. Any change in the deflection of the instrument thus indicates a phase displacement and it is possible to decide without difficulty, from the direction of the change in deflection, whether the clock under test is running fast or slow, if it is made clear from which of the two frequencies the relay switching the instrument circuit is being energized.

There are the following suitable possibilities of forming a frequency from the movement of the balance of a clock. The individual beats of the anchor or the escapement wheel may be allowed to act through a microphone on an amplifier. This particularly simple method is discussed in detail below.

In the accompanying drawing, Fig. 1 is a diagrammatic representation of one form of my invention; Fig. 1a is a diagram illustrating certain relations of voltage and current in the operation of the apparatus shown in Fig. 1; Fig. 2 represents an oscillograph record of the ticking of a watch or other time piece; and Fig. 3 is a diagram illustrating another embodiment of my invention and Fig. 4 is a view of the same character as Fig. 1, showing still another embodiment of my invention.

In Figs. 1 and 1a, a constructional form of the invention is illustrated in principle. Any suitable means may be employed for producing frequencies corresponding respectively to the running of a standard time piece and of the time piece under test. As an example, I have indicated at 31 the watch or other time piece to be tested, and at 32 a standard watch of the same type as the watch to be tested, that is to say a standard watch having the same normal number of beats per minute. Both watches are placed (on any suitable support or holder) adjacent to two microphones 41 and 42 respectively, of any ordinary or approved construction, so that the beat noises of the watches will act on said microphones. The microphones are connected in circuit (in a well-known manner) with amplifiers 51 and 52 respectively, in order to intensify the relatively weak fluctuations of voltage produced in the microphones, so that the intensified fluctuations will be strong enough to actuate devices having the character of relays. In the example illustrated by Fig. 1, the amplified voltages of one frequency, for instance, the frequency of the watch 31 under test, are applied to the grid of an ionic controlling tube 1 and the voltage impulses of the standard frequency derived from the watch 32 through the parts 42, 52 are applied to the grid of an ionic controlling tube 2.

These controlling tubes, as is well-known, have the property that they can easily be started by an auxiliary voltage, but that extinction is possible only by breaking the anode circuit. 3 is a condenser, 4 a current indicating apparatus, 5 and 6 are resistances, 7 is a limit relay and 8 any well-known circuit or source for obtaining a constant voltage. The indicating instrument 4, to which only current impulses are supplied, should be damped sufficiently in order to obtain a steady position of the pointer, scriber, or other indicating element. For this purpose, I may employ any well-known or approved expedients.

The mode of operation of the arrangement will be clear from Fig. 1a. In this figure, 1a denotes those voltage peaks which are applied to the grid of the ionic controlling tube 1 in accordance with the frequency under test. By 2a are denoted the voltage peaks which are applied to the grid of the ionic controlling grid 2 in accordance with the standard frequency. Below the illustration of the time interval of these voltage peaks, I have indicated the time interval during which the current J flows through the instrument 4. The rectangles shown in Fig. 1a represent the current impulses flowing through said instrument, the height of each rectangle is determined by the constant voltage and the resistances in the circuit and is therefore constant, while the width of each rectangle corresponds to the time interval between the voltage peaks 1a and 2a. In other words, in the lower portion of Fig. 1a the ordinates represent current, and the abscissæ time, in correspondence to the time intervals represented by the abscissæ at the upper portion of Fig. 1a. As soon as the first impulse has started the tube 1, a current flows through this tube, the instrument 4, the resistance 5 and the limit relay 7. The limit relay 7 does not respond because it is so dimensioned that it requires the sum of the anode currents of both tubes in order to respond. As soon as the tube 2 is lighted or started by the impulse 2a, the condenser 3 will be enabled to discharge. This will be understood upon considering that previous to this moment the two plates of the condenser were under different potentials, as will be apparent if the condenser 3 is considered as a diagonal branch of a bridge circuit formed by the constant resistances 5, 6 and by the variable resistances constituted by the tubes 1 and 2. As long as an anode current flowed only through the tube 1, the internal resistance of such tube was comparatively low, while at the same time the internal resistance of the tube 2 was practically infinitely great. The two condenser plates therefore were connected with points of different potentials, and consequently the condenser was in the charged condition. At the moment that the tube 2 is lighted or started as above referred to, the condenser 3 will be discharged in impulse fashion through both tubes 1 and 2. The discharge current of the condenser will increase the anode current flowing through the tube 2, but will decrease the anode current flowing through the tube 1. If the condenser 3 is of proper size, the anode current in the tube 1 will at that moment be compensated or balanced fully by the discharge current of the condenser, so that the tube 1 will be extinguished. The instrument circuit is thus temporarily devoid of current and is switched on again only by the next voltage peak 1a, which starts the tube 1 and, through the condenser 3, extinguishes the tube 2. The pointer of the instrument is thus adjusted to a mean value, which is dependent upon the ratio of the length of time during which current is flowing through the instrument 4, to the length of time during which the instrument is devoid of current. By selecting a sufficiently damped instrument, a stationary position of the pointer is thus obtained, which only varies when a frequency displacement takes place between the two series of impulses.

Under the above assumption that the tube 1 is being controlled by the frequency of the watch under test, an increasing deflection of the instrument 4 indicates that the voltage peaks 2a are increasingly lagging behind the voltage peaks 1a and that, therefore, the frequency of the watch under test is higher than the standard frequency. On the other hand, a decrease in the deflection of the pointer would indicate that the watch under test is running slow.

The use of ionic controlling tubes as relays has the advantage that the time constant of the relay is practically zero and thus need not be considered at all, and that, above all, there is no danger that e. g. the time constant of one relay will change with long-continued use. In certain circumstances, however, this advantage may also be disregarded and mechanical relays employed, provided that both relays have a sufficiently uniform time constant. Slow changes during a longer interval of time would not influence and not disturb the individual comparison measurements.

The limit relay 7 is to prevent the measurement being interrupted at the moment when the voltage peaks 1a and 2a momentarily overlap on phase displacement. If both tubes are started simultaneously, the condenser 3 then remains inactive and current would flow continuously through both tubes. This double anode current causes the limit relay 7 to respond. This momentarily opens the anode circuit of both tubes, so that now the arrangement is again ready to operate.

It is proposed above to derive the frequency of the time piece under test and, in certain circumstances, also the frequency of the standard time piece, electrically by means of the periodically moving parts of the time piece, for instance, the balance, the anchor, the escapement wheel or the like, by a microphone influenced by the percussive noises of the time piece. It has been found that, in this case, difficulties are still to be overcome because, in the electro-acoustic reception of noises, no precisely marked and regularly recurring individual voltage peaks are obtained, which may be used without difficulty, after suitable amplification, for operating the relay. The ticking of the time piece, which has a very marked sound effect on the ear, as can be seen from the illustration of an oscillograph record in Fig. 2, produces a whole group of voltage peaks which greatly vary in height, and the rhythm and height of which vary considerably within the different periods. To this extent the precise time control of a relay offers considerable difficulties, quite apart from the fact that a certain noise intensity exists during the whole time period, even during the time when no noise can be detected by the ear, so that, therefore, the sensitivity of the arrangement receiving the sound and controlling the relay cannot be determined to any desired degree. Since the above mentioned group of voltage peaks, moreover, occupies a comparatively large proportion of each period, the further difficulty arises that the two frequencies interfere with one another, this being the case when the phases of the two frequencies are almost equal. In this case it may happen that the first voltage peak of the time piece which is slightly leading energizes the relay and reverses the armature and that directly afterwards the first voltage peak of the slightly lagging frequency sets the relay to the other position and then, however, a further voltage peak of the leading frequency wrongly re-establishes the initial position and thus falsifies the indicated result.

In order to obviate the above described difficulties, another feature of my invention makes special provisions to determine clearly the beginning and end of the impulses within the periods. An important means for this, according to the invention, consists in locking the impulse-controlled relay arrangement immediately after its excitation against an excitation which takes place in the same sense, this locking being effected for a length of time which must be less than a full period. By this means, above all, the relay armature is prevented, as has been briefly mentioned above, from being reversed again in an undesirable manner by the relay being operated too long.

A further step in this direction consists in using a special amplifying arrangement for coupling the time pieces producing the frequencies and the relay arrangement, the amplifier being purposely constructed in such a manner that the amplification departs as far as possible from linearity. If this deviation takes place in such a manner that the degree of amplification greatly increases with increasing controlling voltage, then substantially only the higher voltage peaks are amplified and the lower voltage peaks are rendered practically completely ineffective. If, on the contrary, the amplifier is so dimensioned that it operates near a maximum value, then the higher voltage peaks are amplified only up to about the same degree as the lower peaks, so that then a more uniform operation is also the result.

As is clear from the mode of operation of the arrangement illustrated in Figure 1, it is important that the duration of the impulses should correspond as accurately as possible to the phase difference between the two frequencies. To this end, however, it is necessary that points of the period which are as sharply defined as possible should be used for forming the impulses. In general, the above mentioned measures satisfy the conditions to be fulfilled. However, there are time pieces with which sufficiently accurate test results are difficult to obtain by these means alone, because the noise "threshold" of these clocks, that is, the minimum value of the alternating voltage caused by their constant noises is, at the outset, unfavourably high and, in addition, the peaks produced by the beats of the anchor or escapement wheel are particularly irregular or else a so-called "preliminary beat" is produced by the actual beat. In these cases it may be preferable, instead of the above described measures, to integrate the voltage peaks over the entire period by rectifying them or cutting off a half and thus obtaining a wave current which is caused to act on the relay arrangement. This wave current still contains any irregularities which result from the differences between the individual periods. Thus, in many cases, there would be no object in using it directly for controlling the measuring circuit.

A constructional example of the invention is diagrammatically illustrated in Fig. 3. Reference numerals 10 and 11 denote two coils, for instance, two telephone coils which are energized in accordance with the running noises produced by the watch 31 under test and by a standard watch 32. At 10a an 11a, I have indicated the diaphragms of the respective telephones. Reference numerals 12 and 13 denote two amplifiers having a rectifier and electrical oscillatory circuit, the oscillatory circuits being tuned to the standard frequency and undamped. The output coils 14 and 15 energize by the oscillatory circuits act on two coils 16 and 17, which are provided in the grid circuits of two ionic relays 18 and 19. Reference numeral 20 denotes the common grid bias battery and 21 and 22 are two condensers which, on starting of the anode current of the respective tube, are so charged through transformer 23 and 24 and rectifiers 25 and 26 that the further part of the voltage curve proceeding from the coils 16 can no longer cause the ionic controllers to respond. The condensers 21 and 22 discharge in the course of a period through the rectifiers 25, 26 and the secondary coils of the transformers 23 and 24. Should the resistance of the rectifiers in the blocking direction be too great, then special discharge resistances may also be provided for the condensers. The reference numeral 27 denotes the common anode battery of the two tubes, 9 the instrument which is connected in the anode circuit of one tube and 29 a condenser by means of which the tubes extinguish one another. The reference numeral 30 denotes a limit relay, which responds if both ionic controllers should happen to have been simultaneously started.

The operation should be quite clear. If, for instance, the ionic tube 18 is lighted or started first, its grid is "locked" for approximately the duration of a period. At the same time, the instrument 9 is traversed by a current, the strength of which is constant if the voltage of the current source 27 is constant. As soon as the tube 19 is started, it causes the tube 18 to be extinguished due to the discharging impulse of the condenser 29. Consequently, the instrument 9 becomes devoid of current until the tube 18 is again started. In this manner, therefore, the running of the time piece under test can easily be read from the change in the deflection of the measuring instrument 9.

Instead of the ionic controllers, in certain circumstances, mechanical relays may be used. An example of a simple construction of this type is shown in Fig. 4. The parts 4, 8, 31, 32, 41, 42, 51, and 52 correspond to those designated by the same reference characters as in Fig. 1. Direct current supplied by the source or device 8 serves to energize a relay having two coils 61 and 62 adapted to exert opposite attractions on an armature 63, constructed with a tendency not to remain in a central position, but to rest either against a contact 64 or against a stop 65. When the coil 61 is energized by an impulse resulting from a heat noise in the watch 31 under test, the armature 63 will be attracted to engage the contact 64, thereby closing the circuit of the instrument 4. This circuit remains closed until an impulse resulting from a beat noise of the standard watch 32 energizes the coil 62, thus bringing the armature 63 to the right-hand position, against the stop 65, and opening the circuit of the instrument 4. The instrument circuit will remain open until the next beat noise of the watch under test again energizes the coil 61. The indications of the instrument 4 will take place exactly as explained with reference to Fig. 1a, that is to say, if the watch under test is running at the correct speed, the time intervals during which the instrument 4 receives current will be equal, and the indication of the instrument constant (if proper damping of the instrument is employed, as stated above). If the watch under test is running slow, the time intervals during which the instrument 4 receives current will decrease progressively, and the indications of such instrument will show a corresponding progressive decrease. Similarly, if the watch under test is fast (gaining on the standard watch), the time intervals during which the instrument 4 receives current will increase progressively, with a corresponding increase in the deflection or indication of such instrument. I prefer to use a highly damped indicating instrument, and the pointer which is indicated by the arrow in Figs. 1, 3, and 4 may be considered as connected with a coil mounted to turn about the axis of the pointer, this being a well known type of electrical indicating instrument.

I claim:

1. In a device for testing the running of time pieces, a highly damped current indicating instrument, a current source, means for producing in connection with a time piece a series of electrical impulses in accordance with the rhythm of the periodically moving parts of the time piece under test, means for producing a second series of electrical impulses, of a standard frequency which corresponds to that which the first mentioned series of impulses exhibits on the correct running of the time piece under test, and means for connecting the said instrument to the current source by each impulse of one series of impulses and disconnecting said instrument from the current source by each impulse of the other series of impulses.

2. In a device for testing the running of time pieces, a highly damped electrical instrument of the rotating coil type, and a current source of constant voltage, means for producing in connection with a time piece a series of electrical impulses in accordance with the rhythm of periodically moving parts of the time piece under test, means for producing a second series of electrical impulses, of a standard frequency which corresponds to that which the first mentioned series of impulses exhibits on the correct running of the clock under test, and means for connecting the said instrument to the current source by each impulse of one series of impulses and disconnecting said instrument from the source by each impulse of the other series of impulses.

3. In a device for testing the running of time pieces, a highly damped current indicating instrument, a current source, means for producing in connection with a time piece a series of electrical impulses in accordance with the rhythm of the periodically moving parts of the time piece under test, means for producing a second series of electrical impulses, the frequency of which corresponds to that which the first mentioned series of impulses exhibits on the correct running of the time piece under test, and a relay on which the impulses of both series of impulses act in such a manner that the said instrument is connected to the current source by each impulse of one series of impulses and is disconnected from the current source by each impulse of the other series of impulses.

4. In a device for testing the running of time pieces, a highly damped current indicating instrument, a current source, means for producing in connection with a time piece a series of electrical impulses in accordance with the rhythm of the periodically moving parts of the time piece under test, means for producing a second series of electrical impulses, the frequency of which corresponds to that which the first mentioned series of impulses exhibits on the correct running of the time piece under test, amplifiers for said impulses, two ionic controlling tubes, each of which can be started by one series of impulses through said amplifiers, means operated by the starting of one ionic controlling tube to cause the other to be extinguished, and connections by which the current indicating instrument is located in the anode circuit of one of the two tubes.

5. In a device for testing the running of time pieces, a highly damped current indicating instrument, a source of current, means for producing in connection with a time piece a series of electrical impulses in accordance with the rhythm of the periodically moving parts of the time piece under test, means for producing a second series of electrical impulses, the frequency of which corresponds to that which the first mentioned series of impulses exhibits on the correct running of the time piece under test, amplifiers for said impulses, two ionic control tubes, each of which can be started by a series of impulses through said amplifiers, the anodes of the two ionic control tubes being connected with each other, a condenser located in such anode connection and so dimensioned that, on starting of the anode current of one tube, the other tube is extinguished, and means by which the current indicating instrument is inserted in the anode circuit of one tube.

6. In a device for testing the running of time pieces, a highly damped current indicating instrument, a source of current, means for producing in connection with a time piece a series of electrical impulses in accordance with the rhythm of the periodically moving parts of the time piece under test, means for producing a second series of electrical impulses, the frequency of which corresponds to that which the first mentioned series of impulses exhibit on the correct running of the time piece under test, amplifiers for said impulses, two ionic control tubes, each of which can be started by a series of impulses through said amplifiers, means which, on the ignition of one ionic control tube, cause the other to be extinguished, the current indicating instrument being connected in the anode circuit of one of the two tubes, a limit relay which is inserted in an anode circuit common to both tubes and so adjusted that it is caused to respond by the sum of the anode currents of the two tubes, and a contact opening on operation of said limit relay and arranged in the anode circuit of one of said ionic control tubes.

7. In a device for testing the running of timepieces, a highly damped current indicating instrument, a source of current, a microphone for picking up the periodic running noises of the time piece under test, an amplifier the input side of which is connected with said microphone to produce a series of impulses corresponding to the rhythm of said noises, means for producing a series of electrical impulses of a standard frequency which corresponds to that frequency which the running noises of the time piece under test will exhibit on correct running, means for providing, in spite of unavoidable irregularities in the runing noises, a series of impulses with equal intervals, a relay to which the output of the amplifier is so connected and on which the impulses of the first mentioned series of electrical impulses act in such a manner that the indicating instrument is connected to the current source by each impulse of one of said series of impulses and is disconnected from the current source by each impulse of the other of said series of impulses.

8. In a device for testing the running of time pieces, a highly damped current indicating instrument, a current source, a microphone for picking up the periodic running noises of the time piece under test, an amplifier, a connection from the microphone to the input stage of the amplifying arrangement, to produce a series of impulses corresponding to the rhythm of said noises, means for producing a series of electrical impulses, the frequency (standard frequency) of which corresponds to that which the running noises of the time piece under test will exhibit on correct running, a relay to which the output of the amplifier is so connected and on which the impulses of the series of electrical impulses of standard frequency act in such a manner that the indicating instrument is connected to the current source by each impulse of one of said series of impulses and that the said instrument is disconnected from the current source by each impulse of the other of said series of impulses, and means for locking the relay immediately on or after the action of an impulse, against further impulse connections of the same series of impulses for a time which is less than the interval between two impulses of the same series of impulses.

9. In a device for testing the running of time pieces, a highly damped current indicating instrument, a current source, means for producing a series of electrical impulses in accordance with the rhythm of periodically moving parts of the time piece under test, means for producing a second series of electrical impulses of a standard frequency which corresponds to that which the first mentioned series of impulses exhibits on the correct running of the time piece under test, amplifiers for said impulses, two ionic control tubes, each of which is ignited by a series of impulses through said amplifiers, means which, by the ignition of one of the ionic control tubes, cause the other to be extinguished, the current indicating instrument being connected in the anode circuit of one of the two tubes, and condensers which are so connected in series with the control grids of the said tubes and to the anode circuits of the said tubes that, on starting of the anode current, the condensers are charged whereby the control grids are temporarily rendered insensitive to further controlling impulses.

10. In a device for testing the running of time pieces, a highly damped current indicating instrument, a current source, a microphone for picking up the periodic running noises of the time piece under test, an amplifier the input stage of which is connected with said microphone to produce a series of impulses corresponding to the rhythm of said noises, means for producing a series of electrical impulses, the frequency (standard frequency) of which corresponds to that which the running noises of the time piece under test will exhibit on correct running, a relay arrangement to which the output of the amplifier is so connected and on which the impulses of the series of electrical impulses of standard frequency act in such a manner that the indicating instrument is connected to the current source by each impulse of one of said series of impulses and the indicating instrument is disconnected from the current source by each impulse of the other of said series of impulses, the amplifier connected between the microphone and the relay being so constructed that the amplification curve will exhibit a considerable departure from linearity.

11. In a device for testing the running of time pieces, a highly damped current indicating instrument, a current source, a microphone for picking up the periodic running noises of the time piece under test, an amplifier to the input stage of which the microphone is connected, to produce a series of impulses corresponding to the rhythm of said noises, means for producing a series of electrical impulses, the frequency (standard frequency) of which corresponds to that which the 20 running noises of the time piece under test exhibit on correct running, a relay to which the output of the amplifier is so connected and on which the series of electrical impulses of standard frequency act in such a manner that the indicating instrument is connected to the current source by each impulse of one of said series of impulses and the indicating instrument is disconnected from the current source by each impulse of the other of said series of impulses, a rectifier to which the irregular voltage peaks proceeding from the microphone are supplied in such a manner that a wave current of the frequency of the periodically moving parts of the time piece under test is formed, an oscillatory structure which is tuned to the standard frequency and excited by this wave current, said oscillatory structure being connected to the relay in such a manner that the relay is caused to respond at certain points of the substantially sinusoidal voltage variations arising in the oscillatory structure.

12. In a system for testing the running of time pieces by comparison with a standard, means for producing in connection with a time piece under test, a series of electrical impulses in accordance with the rhythm of the periodically moving parts of such time piece, means for producing a second series of electrical impulses of a standard frequency which corresponds to that which the first mentioned series of impulses will exhibit on the correct running of the time piece under test, an indicating circuit having connections to receive said impulses, and means whereby said indicating circuit will be rendered operative by each impulse of one of said series of impulses and inoperative by each impulse of the other series.

13. In a system for testing the running of time pieces by comparison with a standard, means for producing in connection with a time piece under test, a series of electrical impulses in accordance with the rhythym of the periodically moving parts of such time piece, means for producing a second series of electrical impulses of a standard frequency which corresponds to that which the first mentioned series of impulses will exhibit on the correct running of the time piece under test, an indicating circuit including a source of current and an indicating instrument, and means for connecting said instrument to the current source by each impulse of one of said series of impulses and disconnecting said instrument from said source by each impulse of the other series.

14. In a system for testing the running of time pieces by comparison with a standard, a plurality of microphones for picking up the periodic sounds of a standard time piece and of the time piece under test, and thus producing two series of electrical impulses, an indicating circuit having connections to receive said impulses, and means whereby said indicating circuit will be rendered operative by each impulse of one of said series of impulses and inoperative by each impulse of the other series.

15. In a system for testing the running of time pieces by comparison with a standard, a plurality of microphones for picking up the periodic sounds of a standard time piece and of the time piece under test, and thus producing two series of electrical impulses, an indicating circuit including a source of current and an indicating instrument, and means for connecting said instrument to the current source by each impulse of one of said series of impulses and disconnecting said instrument from said source by each impulse of the other series.

16. In a device for testing the running of time pieces, a highly damped current indicating instrument, a source of current, means for producing in connection with a time piece a series of electrical impulses in accordance with the rhythm of the periodically moving parts of the time piece under test, means for producing a second series of electrical impulses, the frequency of which corresponds to that which the first mentioned series of impulses exhibit on the correct running of the time piece under test, amplifiers for said impulses, two ionic control tubes, each of which can be started by a series of impulses through said amplifiers, means which, on the ignition of one ionic control tube, cause the other to be extinguished, the current indicating instrument being connected in the anode circuit of one of the two tubes, a limit relay which is inserted in an anode circuit common to both tubes and so adjusted that it is caused to respond by the sum of the anode currents of the two tubes, and a contact opening on operation of said limit relay and arranged in the anode circuit of both of said ionic control tubes.

RUDOLF TAMM.